A. L. GENTER.
FILTERING APPARATUS.
APPLICATION FILED OCT. 8, 1919.
1,405,406.
Patented Feb. 7, 1922.
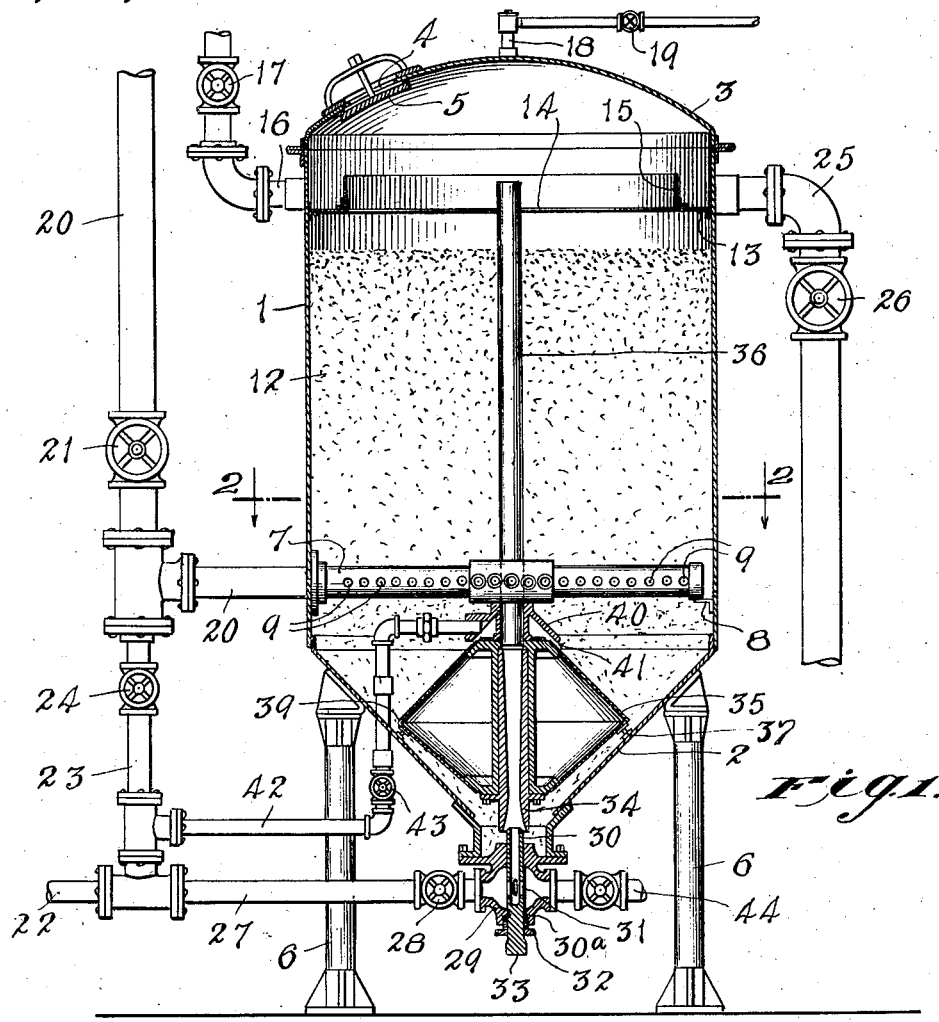
INVENTOR
ALBERT L. GENTER
BY
William P. Hammond
ATTORNEY

UNITED STATES PATENT OFFICE.

ALBERT L. GENTER, OF SALT LAKE CITY, UTAH, ASSIGNOR TO UNITED FILTERS CORPORATION, OF NEW YORK, N. Y., A CORPORATION OF DELAWARE.

FILTERING APPARATUS.

1,405,406.  Specification of Letters Patent.  Patented Feb. 7, 1922.

Application filed October 8, 1919. Serial No. 329,248.

*To all whom it may concern:*

Be it known that I, ALBERT L. GENTER, a citizen of the United States, residing at Salt Lake City, in the county of Salt Lake and State of Utah, have invented certain new and useful Improvements in Filtering Apparatus, of which the following is a specification.

This invention relates in general to filters of the type in which the liquid to be filtered passes by gravity through a granular filtering medium, the invention being more particularly directed to improved washing and cleansing means for the filtering medium.

The objects of the invention are to provide improved means for washing the filtering medium in which the wash liquid is forced under pressure through the filtering medium in a reverse direction to the flow of liquid during the filtration; to provide means for thoroughly stirring and agitating the filtering medium without the use of mechanical agitators in the nature of revolving shafts and rotating agitator arms; to obtain a double washing of the filtering medium; to thoroughly agitate the filtering medium during both washing operations, for these purposes to provide an injector nozzle for the wash water to raise and agitate the filtering medium, to obtain an adjustable injector to accommodate various pressures of wash water and different sized grains of the filtering medium; to provide overflow means adjacent the wash water outlet to prevent the filtering medium from escaping and to carry off the floating foreign matter and dirt in the wash water; to provide a readily removable eductor lining so that a new lining may be substituted for a worn one; and to obtain other results and advantages as may be brought out by the following description.

Referring to the accompanying drawings in which like numerals of reference indicate the same parts throughout the several views, Figure 1 is a vertical sectional view through a filter embodying my invention, and Figure 2 is a horizontal sectional view taken on line 2—2 of Figure 1.

Specifically describing the present embodiment of my invention, the numeral 1 designates a hollow cylindrical casing provided with an inverted conical bottom 2 and a domed top 3, which is provided with a manhole 4 for inspection and filling of the casing 1 with filter material, the manhole having a conventional cover 5. This casing is supported in a vertical position upon a plurality of standards or columns 6 which are fixed upon a suitable foundation.

Extending transversely of the casing 1 at an intermediate point in its length is a horizontally disposed manifold pipe 7 supported upon a suitable bracket 8 and provided with a plurality of slitted branch collecting pipes 9 projecting at right angles thereto and upon both sides thereof across the casing, as shown by Figure 2, the branch pipes 9 being supported by cross bars 10 fastened upon the walls of the casing 1. These branch collecting pipes are covered with fine mesh screens 11 to prevent the granular filter material 12, such as sand, which fills the casing 1 up to a point slightly below a baffle plate 13, from passing into the pipes 9.

The baffle plate 13 is arranged adjacent the top of the casing 1 and is provided with a central opening 14 surrounded by an annular upstanding overflow flange or rim 15. At one side of the casing 1 and just above the baffle plate 13 a supply inlet pipe 16 for the liquid to be filtered leads into the casing, the said pipe being provided with a valve 17. The liquid to be filtered flows into the casing through this pipe 16, the air escaping through an air outlet 18 at the top of the casing until the casing is filled with liquid, when the air outlet is closed by the valve 19. The liquid flows over the overflow rim 15 and by gravity passes through the granular filtering medium 12, the foreign and solid matter in the liquid being filtered out by and adhering to the granular material, and the filtrate passing through the slitted branch pipes 9 and manifold pipe 7 to a filtrate outlet pipe 20, which may be closed by a valve 21. This filtering action continues until the filtering medium 12 becomes clogged by dirt and solid matter from the liquid passing through it, when it is necessary to thoroughly wash the filtering medium to render it fit for further filtration.

For this purpose a wash water main pipe 22 is provided with a branch pipe 23, having a valve 24, which connects with the filtrate outlet pipe 20 between the valve 21 and the manifold 7. The valve 17 in the inlet pipe 16 and the valve 21 in the filtrate outlet pipe 20 are closed and the valve 24 opened, thus allowing wash water under pressure to pass through the manifold 7 and branch collecting pipes 9 upwardly through the filtering medium 12 in a direction the reverse of the flow of the liquid during filtration. This action disengages some of the coarser dirt and foreign matter from the granular filter material 12 and floats it upwardly over the overflow rim 15 into an effluent outlet pipe 25 provided with a valve 26, which is closed during the filtering operation but open when the filter material is being washed. The overflow rim 15 retards the escape of the wash water through the effluent outlet pipe 25 and allows the dirt to float to the surface and the granular filter material to settle.

There is little agitation of the granular material 12 during this operation and consequently all of the dirt is not removed. To thoroughly cleanse and scrub the granular filter material, the wash water main 22 is provided with a second branch pipe 27 having a valve 28 therein and leading into an eductor casing 29 secured to the apex of the conical bottom of the casing 1. Mounted vertically in the eductor casing 29 is an injector nozzle 30 which has a threaded or other suitable adjustable connection 30ª with the eductor casing, the said nozzle having slots 31 in the walls thereof communicating with the wash water branch pipe 27. A stuffing box 32 is provided between the eductor casing and the nozzle for a watertight joint, and the outer end of the nozzle is headed at 33 to provide a handle for adjusting the nozzle vertically. The upper or inner end of the nozzle passes loosely into the lower end of an eductor tube 34 which extends vertically upward through a double conical baffle 35, centrally of the casing 1, the upper end of said eductor tube communicating with a vertical standpipe 36 extending centrally of the casing 1 through the filter material 12 to a point slightly below the top of the overflow rim 15. It will be observed that the injector nozzle is so arranged as to be readily removed or adjusted without disturbing the pipe connections. The double conical baffle 35 comprises a lower inverted conical shell whose walls are slightly spaced from and substantially parallel to the conical bottom of the casing by spacing bolts or studs 37, and an upper conical shell whose walls incline upwardly toward the center of the casing 1, the bases of the cones meeting as at 39. The valve 24 being closed, as the wash water under pressure passes from the branch pipe 27 through the nozzle 30 and into the eductor tube 34, the granular filter material 12 is drawn by suction downwardly between the conical baffle 35 and the bottom of the casing into the eductor tube 34 and is then forced upwardly through the stand-pipe 36 overflowing at the upper end thereof. This action causes great agitation of the granular material, separating the dirt therefrom and thoroughly cleansing the same. The dirt is carried upwardly over the overflow rim and into the effluent discharge pipe 25, while the granular material settles by gravity to the filter bed. The granular filter material is thus continuously circulated, being forced from the bottom of the casing upwardly through the stand-pipe 36 as rapidly as it settles to the filter bed.

The injector nozzle 30 is vertically adjustable to vary the clearance between it and the lower end of the eductor tube 34 as may be required by various pressures of wash water and different sizes of grains of the filter material. The adjustment allows the injector to be regulated to produce the requisite circulation of the filter material at various pressures of wash water supply, as well as to accommodate various kinds of granular filter material.

At the top of the conical baffle 35 and surrounding the standpipe 36 is a flushing jet 40 which is preferably conical in shape and has the lower edge thereof slightly spaced, as at 41, from the upper conical surface of the baffle 35. A flushing pipe 42 is connected to the wash water main 22 and is provided with a valve 43, said flushing pipe communicating with the jet 40. With the valve 43 open, and when the granular filter material 12 reaches the top of the conical baffle 35 it is further agitated and scrubbed by the strong jet of wash water issuing from the jet 40 and is forced downwardly over the conical baffle to and over the edge 39 thereof, where it is drawn by the injector nozzle 30 into the stand-pipe 36. The filter material is thus given a double washing and scrubbing and is continuously agitated by the injector 30 and flushing jet 40.

Every particle of the filter material even at the extreme center of the bed is thus thoroughly washed and the whole filter bed is kept in constant circulation during the washing operation. The agitation by the wash water itself is more efficient and simpler than mechanical stirrers and agitators which do not cause a circulation of the filter material, and the complicated machinery incident to such mechanical agitators is dispensed with. The flushing jet 40 causes a lateral as well as vertical agitation, and the elevation of the filter material bodily by the injector 30 allows the dirt to separate as the filter material settles. The overflow rim 15 retards the wash effluent to prevent the filter material from passing into the outlet pipe 25, and allows the dirt to float to the surface and flow over the rim while the filter material settles to the filter bed. The conical baffle 35 divides the filter bed so as to prevent clogging of the eductor tube and injector nozzle, and the flushing jet 40 constantly forces the filter material over the edge 39 of the baffle and maintains it in circulation to prevent clogging of the filter bed between the baffle and the bottom of the casing 1. After the wash water effluent becomes sufficiently clear and the filter bed thoroughly clean, the valves 24, 28, 43 and 26 are closed, whereupon the valves 17 and 21 may be opened and the filtration process resumed. The eductor casing 29 may be provided with a valved outlet 44 for draining sand from the filter bed, when it is desired to replace the same.

The operation of the filter is substantially automatic and requires little attention other than the manipulation of the valves.

Having thus described my invention, I claim:

1. In a filter, the combination of a casing adapted to contain a granular filter material, a removable injector nozzle positioned to discharge upwardly within said casing, means for supplying wash liquid under pressure to said injector nozzle to agitate and cause circulation of the filter material within said casing, and means for adjusting said injector to provide requisite circulation at varying pressures of wash liquid supply.

2. In a filter, the combination of a casing adapted to contain a granular filter material, a vertical pipe arranged in said casing and having its lower end spaced from the bottom of the casing, means for injecting a jet of wash liquid under pressure into the lower end of said pipe to cause a circulation of said filter material, and means for adjusting said injecting means relatively to the pipe.

3. In a filter, the combination of a casing adapted to contain a granular filter material, a vertical pipe arranged in said casing and having its lower end inserted into said filter material, a removable nozzle arranged under the lower end of said pipe and in line therewith, means for supplying wash liquid under pressure to said nozzle, and means for adjusting said nozzle relatively to the lower end of said vertical pipe.

4. In a filter, the combination of a casing adapted to contain a granular filter material, a vertical pipe arranged in said casing and having its lower end inserted into the filter material, a pipe connection in the lower portion of the filter for supplying wash liquid under pressure to the vertical pipe, a nozzle interposed between the pipe connection and the vertical pipe so arranged as to be readily removable without disturbing said connection.

5. In a filter, the combination of a casing adapted to contain a granular filter material, a wash liquid inlet at the lower end of said casing for forcing liquid upwardly through said filter material, a wash effluent outlet at the upper end of said casing above the filter material, and an overflow member arranged within said casing adjacent said outlet pipe to retard the flow of effluent and cause the filter material to settle.

6. In a filter, the combination of a casing adapted to contain a granular filter material, a wash liquid inlet at the lower end of said casing for forcing liquid upwardly through said filter material, a wash effluent outlet arranged at the upper end of said casing above the filter material, a baffle plate above said filter material and provided with a central opening surrounded by an annular upstanding rim, the top of which is above the wash effluent outlet, to retard the escape of the liquid and cause the filter material to settle.

7. In a filter, the combination of a casing adapted to contain a granular filter material, piping arranged vertically within said casing, an injector nozzle within said casing and in alignment with said vertical piping, means for supplying wash liquid under pressure to said injector nozzle to agitate and cause circulation of the filter material, and means whereby said injector nozzle may be readily removed from the casing without disconnecting the wash liquid supplying means from the filter.

8. In a filter, the combination of a casing adapted to contain a granular filter material, a vertical pipe arranged in said casing and having its lower end inserted into said filter material, a removable nozzle arranged in the lower end of said pipe and in line therewith, a pipe connection extending laterally from the lower portion of the casing for supplying wash liquid under pressure to said nozzle, said nozzle being adjustable and removable independent of the wash liquid supply pipe.

ALBERT L. GENTER.